United States Patent
McKinzie (10) Patent No.: US 9,625,028 B2
(45) Date of Patent: Apr. 18, 2017

(54) SHAFT RETENTION AND LUBRICATION SYSTEM AND METHOD

(71) Applicant: Deere & Company, Moline, IL (US)

(72) Inventor: Kyle K. McKinzie, Altamont, KS (US)

(73) Assignee: Deere & Company, Moline, IL (US)

( * ) Notice: Subject to any disclaimer, the term of this patent is extended or adjusted under 35 U.S.C. 154(b) by 395 days.

(21) Appl. No.: 14/283,078

(22) Filed: May 20, 2014

(65) Prior Publication Data

US 2015/0337945 A1    Nov. 26, 2015

(51) Int. Cl.
| | |
|---|---|
| F16H 57/04 | (2010.01) |
| F16H 57/00 | (2012.01) |
| F16D 1/06 | (2006.01) |
| F16H 57/08 | (2006.01) |
| F16H 57/023 | (2012.01) |

(52) U.S. Cl.
CPC ............ *F16H 57/0025* (2013.01); *F16D 1/06* (2013.01); *F16H 57/023* (2013.01); *F16H 57/04* (2013.01); *F16H 57/043* (2013.01); *F16H 57/08* (2013.01); *Y10T 403/25* (2015.01); *Y10T 403/255* (2015.01)

(58) Field of Classification Search
CPC ...... F16D 1/06; F16H 57/0025; F16H 57/023; F16H 57/04; F16H 57/043; F16H 57/0479; F16H 57/0482; F16H 57/08; Y10T 403/25; Y10T 403/251; Y10T 403/255; Y10T 403/581
USPC ......... 475/159, 160; 464/16; 403/34, 35, 37, 403/316; 184/6.12
See application file for complete search history.

(56) References Cited

U.S. PATENT DOCUMENTS

| | | | |
|---|---|---|---|
| 3,821,908 A | 7/1974 | Marsch et al. | |
| 8,096,910 B2 * | 1/2012 | Shibukawa | B60K 7/0007 475/159 |
| 8,425,361 B1 * | 4/2013 | Beckner | F16H 57/0479 475/159 |
| 8,500,591 B2 * | 8/2013 | Turner | B60K 17/046 180/343 |
| 8,556,761 B1 * | 10/2013 | Carlton | F16H 57/0486 475/159 |
| 2012/0100950 A1 | 4/2012 | Deans | |

FOREIGN PATENT DOCUMENTS

WO    WO 2009100202 A1 *  8/2009 ........... F16H 57/043

* cited by examiner

*Primary Examiner* — Josh Skroupa
(74) *Attorney, Agent, or Firm* — Lorenz & Kopf, LLP (57) ABSTRACT

A shaft retention and lubricating fluid delivery system and method may be used for mounting a pinion shaft to a pinion carrier and providing lubricating fluid to a pinion and pinion bearing. A retaining pin fits inside a pinion shaft radially bore and a pinion carrier radially bore to constrain the axial and rotational movement of the pinion shaft relative to the pinion carrier. Pressurized lubricant and centrifugal force from pinion carrier rotation aids in maintaining the retaining pin in a retaining position. When the pinion carrier is not rotating, a cap screw prevents the retaining pin from disengaging. An annular gap passage between the cap screw and the interior of the pinion shaft allows lubricating fluid to reach the shaft, pinion and pinion bearing.

18 Claims, 6 Drawing Sheets

SHAFT RETENTION AND LUBRICATION SYSTEM AND METHOD

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates to gear and shaft assemblies, and in particular to a gear shaft retention and lubrication.

BACKGROUND OF THE DISCLOSURE

Gear and shaft assemblies come in various configurations. For example, planetary gear sets, typically include a sun gear, a ring gear, a pinion carrier, and at least one pinion (also known as a planet gear). A simple planetary gear set may have one pinion rotatably mounted to the pinion carrier, while a compound planetary gear set may have a plurality of pinions rotatably mounted to the pinion carrier. Each pinion is rotatably mounted to the pinion carrier through a pinion shaft coupled to the pinion carrier. The pinion carrier may revolve around the sun gear's axis of rotation or may be stationary.

Planetary gear sets are typically part of a larger mechanical assembly, such as a transmission for a work machine. Planetary gear sets allow a device to adjust the speed and torque of an output shaft by adjusting a gear ratio between an input shaft and the output shaft. This may be accomplished by locking one of the gears, such that it is stationary with respect to a shaft it is rotatably mounted to, or by selecting a second set of gears in a stacked planetary gear set. For example, the sun gear may be held stationary, while the pinion and ring gear are allowed to freely rotate, the pinion may be held stationary, allowing the sun and ring gears to rotate, or the ring gear may be held stationary, allowing the sun gear and pinion to rotate. Each combination of rotating and stationary gears results in a different gear ratio between the input and output shafts. Alternatively, by locking two gears, such as the sun and ring gears, the ring gear and the pinion, or the pinion and the sun gear, will cause the entire planetary gear set to rotate together. This results in the rotational speed of the input and output shafts being equal.

A common problem in planetary gear sets is how to cost effectively constrain the pinion shaft from moving axially and rotationally with respect to the pinion carrier. Constraint of the pinion shaft can be especially challenging when lubricating fluid is provided to the pinion bearings by pressure. For example, high lubricating fluid pressure may axially push on the pinion shaft. Rotation of a poorly lubricated gear may apply torque to the gear shaft, which may result in additional wear, such as to the gears, shafts, and bearings, and/or improper alignment between the pinion and the ring and/or sun gears. High rotational speed applications further require the constraining method to be robust. Further complications arise in a planetary gear set with a low profile, which can be packaged into a compact envelope.

SUMMARY OF THE DISCLOSURE

A shaft retention and lubricating fluid delivery system and method are disclosed, such as for mounting a pinion shaft to a pinion carrier in a planetary gear set to prevent axial and rotational movement of the pinion shaft relative to the pinion carrier, and to provide lubricating fluid to the pinion and a pinion bearing.

According to one aspect of the disclosure, a gear is mounted to a gear shaft extending along an axis. The gear shaft has a shaft first radial bore extending from an outer surface of the gear shaft at least partially through the gear shaft in a radial direction. The gear shaft may have a shaft second radial bore extending from an outer surface of the gear shaft at least partially through the gear shaft in a radial direction and is axially aligned with the gear. The gear shaft has a shaft axial bore with a shaft axial bore diameter, where the shaft axial bore extends in an axial direction at least partially through the gear shaft and through at least one of the shaft first radial bore and the shaft second radial bore. A mounting surface has an opening at least partially in the axial direction for receiving the gear shaft and having a mounting surface first radial bore coaxial with the shaft first radial bore and extending from the opening through at least a portion of the mounting surface. A fastener has a fastener head and a fastener shank, the fastener disposed at least partially within the shaft axial bore. An annular gap passage is formed between the shaft axial bore and the fastener shank in a radial direction and between the shaft first radial bore and the shaft second radial bore in an axial direction.

According to another aspect of the disclosure, the gear shaft retention and lubrication system includes a gear mounted to a gear shaft extending along an axis. Where the gear shaft has a shaft first radial bore extending from an outer surface of the gear shaft at least partially through the gear shaft in a radial direction and a shaft second radial bore extending between the outer surface and the shaft axial bore. The shaft second radial bore is axially aligned with the gear. The gear shaft having a shaft axial bore having a shaft axial bore diameter and extends in an axial direction at least partially through the gear shaft and through at least one of the shaft first radial bore and the shaft second radial bore. The gear shaft has a gear shaft recess having a diameter greater than the shaft axial bore. The gear shaft recess extends in the axial direction only partially through the gear shaft. A mounting surface has an opening at least partially in the axial direction for receiving the gear shaft and has a mounting surface first radial bore coaxial with the shaft first radial bore that extending from the opening through at least a portion of the mounting surface. A fastener is provided having a fastener head and a fastener shank where the fastener head has a diameter smaller than the gear shaft recess diameter and larger than the shaft axial bore diameter, the fastener disposed at least partially into the shaft axial bore. An annular gap passage is formed between the shaft axial bore and the fastener shank in a radial direction and between the shaft first radial bore and the shaft second radial bore in an axial direction.

According to another aspect of the disclosure, a method of lubricating the gear and the gear bearing is provided. The method includes: providing a mounting surface having a mounting surface first radial bore. Providing a gear shaft mounted to the mounting surface, the gear shaft having a shaft first radial bore coaxial with the mounting surface first radial bore, a shaft second radial bore, and an shaft axial bore having an shaft axial bore diameter. A gear and gear bearing are mounted to the gear shaft. A fastener is provided, and has a fastener shank. Where the diameter fastener shank is less than the diameter of the shaft axial bore. The fastener shank is at least partially disposed within the shaft axial bore, forming an annular gap passage between the shaft axial bore and the fastener shank. The mounting surface first radial bore, the shaft first radial bore, the annual gap passage, the shaft second radial bore, the gear bearing, and the gear are all fluidly connected. Lubricating fluid is supplied to the mounting surface.

These and other features and advantages of the present disclosure will become clear to a person skilled in the art after reading the following detailed description and in consideration of the drawings.

BRIEF DESCRIPTION OF THE DRAWINGS

Like reference numerals in the drawings indicate like components, parts, or operations.

DETAILED DESCRIPTION

The following describes one or more example embodiments of the disclosed shaft retention and lubricating fluid delivery system and method, as shown in the accompanying figures of the drawings described briefly above. Various modifications to the example embodiments may be contemplated by one of skill in the art.

In certain applications gears and gear shafts are subjected to high rotational speeds, which in turn subjects the rotating members to potentially significant centrifugal force. Centrifugal force can be viewed as the inertia created by a rotating body tending to cause the rotating body to move in a direction away from the center of rotation. Centrifugal force acting on a fastener tends to force the fastener to move in a direction away from the axis of rotation. If the fastener is secured to the shaft such that the shaft is between the fastener and the center of rotation, centrifugal force will cause the fastener to move in a direction away from the axis of rotation, and thus the shaft.

Accordingly it may be useful to have the gear shaft retained in a manner that minimizes the effects of centrifugal force and high fluid pressure, or uses it to assist in retaining the gear shaft. Such a mechanism, for example, may include a retaining pin that is inserted into the interior of the gear shaft and interfaces between the gear shaft and a mounting surface. In one such embodiment, the retaining pin may have a retaining pin head, such that centrifugal force and pressure acting on the retaining pin cause the retaining pin to wedge against the gear shaft and a mounting surface, but the location of the retaining pin head prevents the retaining pin from exiting the gear shaft. In other embodiments a bore on the mounting surface for interfacing with the retaining pin has a terminal end, which limits the radial movement of the pin out of the gear shaft and mounting surface, eliminating the need for a retaining pin head.

To prevent the retaining pin from exiting a retaining position, a blocking mechanism may be used, such as a cap screw. The cap screw may be used to limit the radial movement of the retaining pin such that the retaining pin remains in a retaining position even if fluid pressure is reduced and/or there is no rotational movement. However, the blocking mechanism should be designed such that the flow of lubricating fluid is not impeded, and so that fluid pressure can act on the retaining pin.

In certain gear and shaft assemblies, it may be desirable to axially and rotationally restrain the gear shaft in a manner that is compact and robust. For example, during operation of a planetary gear set, lubricating fluid may be supplied to the bearings and gears under high fluid pressure to reduce wear between moving components and ensure smooth operation of the planetary gear set. High pressure lubricating fluid passing through the gear shaft to the pinion can place radial or axial stress on the fasteners used to secure the gear shaft by tending to push the fastener out of the gear shaft. While the following description describes a planetary gear set example, it will be appreciated that the disclosure may be applied to other assemblies requiring retention during rotational and/or high pressure operations.

Figure 1:
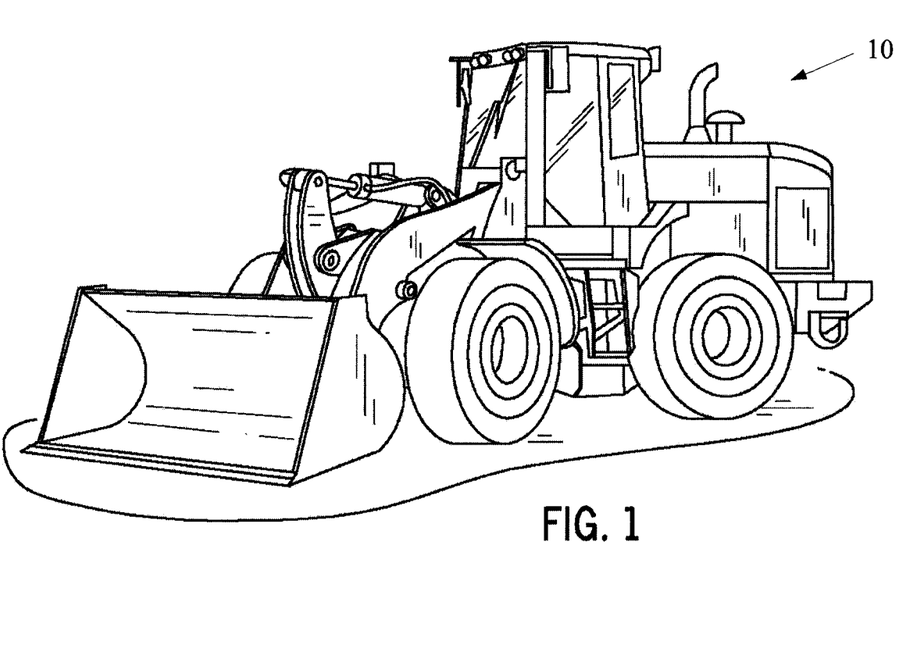
FIG. 1 is a perspective view of an example work machine having a transmission with a planetary gear set in which the shaft retention and lubrication system and method of the disclosure can be utilized.

FIG. 1 shows an exemplary work machine 10. The work machine 10 may, for example, be a wheeled loader as depicted. The work machine 10 may have one or more gear sets, such as an example stacked planetary gear set 20 shown in FIG. 2. The gear set may be utilized in a transmission, engine, or any other application requiring high power density. It will be understood that various other configurations may also be possible and that the gear set 20 may be used in a variety of machinery, vehicles, or other settings.

Figure 2:
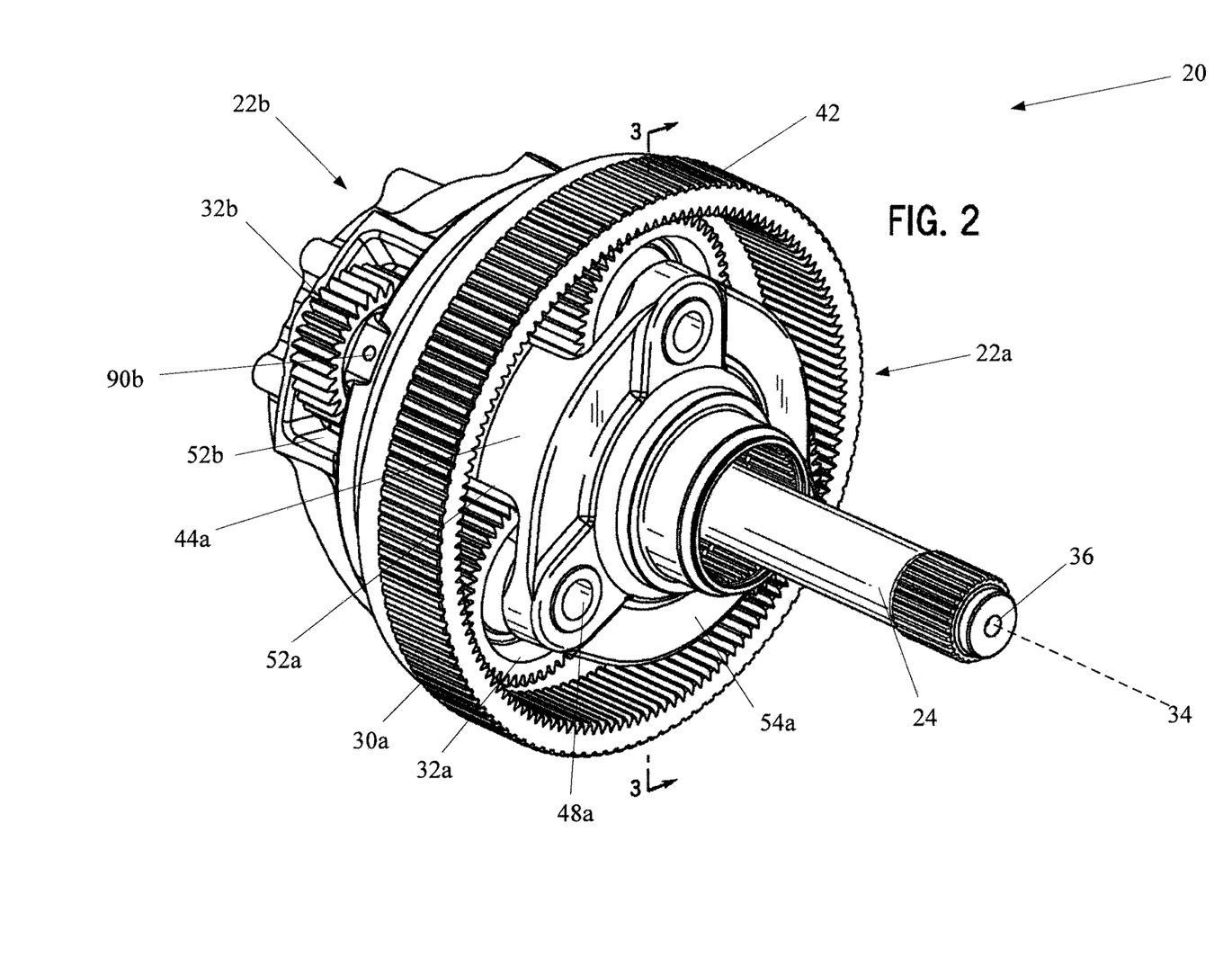
FIG. 2 is a perspective view of a stacked planetary gear set thereof.

Referring now to FIG. 2, the example stacked planetary gear set 20 is shown, having a first planetary gear set 22a and a second planetary gear set 22b disposed axially from one another and sharing a common sun gear shaft 24 and a housing 26. It will be appreciated that a single planetary gear set, using only the first planetary gear set 22a, may alternatively be used. The first planetary gear set 22a has a sun gear 28a, a ring gear 30a and at least one pinion (or planet gear) 32a. Similarly, the second planetary gear set 22b has a sun gear (not shown), at least one pinion 32b, and a ring gear (not shown). The first planetary gear set 22a may be disposed axially forward of the second planetary gear set 22b, as defined by axis 34.

The first planetary gear set 22a will now be described in greater detail. It will be appreciated that the second planetary gear set 22b can have a similar assembly, as well as a similar retention and lubrication system as the first planetary gear set 22a. Components of the first planetary gear set 22a will be designated with the suffix "a", whereas components of the second planetary gear set 22b will be designated with the suffix "b".

Figure 3:
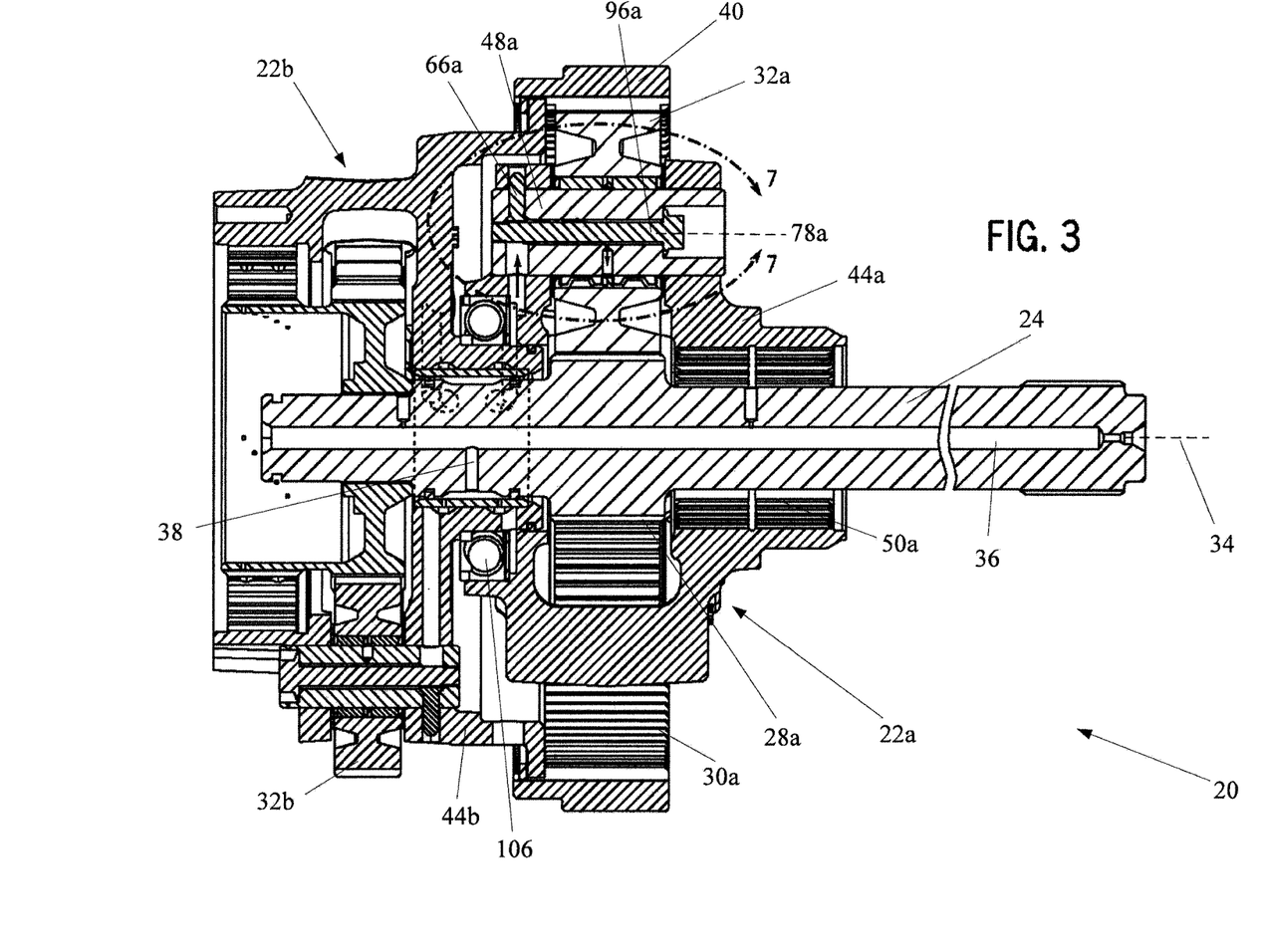
FIG. 3 is a cross-section view taken along line 3-3 of FIG. 2.

Referring now to FIGS. 2 and 3, the sun gear shaft 24 is coaxial with and rotates about the axis 34. Passing at least partially through the sun gear shaft 24 in an axial direction is a sun gear shaft axial bore 36. Connected to the sun gear shaft axial bore 36, and extending in a radial direction through the outer surface of the sun gear shaft 24, is a sun gear shaft radial bore 38. The sun gear 28a may be axially and rotationally retained on the sun gear shaft 24, such as through a retaining ring or splines on the sun gear shaft 24. The sun gear 28a has a plurality of gear teeth set on its outer radial surface for engaging the pinion 32a. The gear teeth may, for example, be for a spur gear or a helical gear. The type gear teeth used for the sun gear 28a, should similarly be used for the ring gear 30a and the pinion 32a.

The ring gear 30a may be incorporated as part of the interior of the housing 40 of the gear set 20, as shown in FIG. 3, or may be a separate gear as shown in FIG. 2. If the ring gear 30a is separate from the housing 40, it may engage the housing 40, such as through complementary splines 42 on an exterior surface of the ring gear 30a and interior surface of the housing 40. The ring gear 30a may be coaxial with, and rotates about, the axis 34. The ring gear 30a may have a plurality of gear teeth on an interior surface for engaging the pinion 32a. It will be appreciated that the ring gear 30a may alternatively rotation independently of the housing 40.

Figures 4, 5:
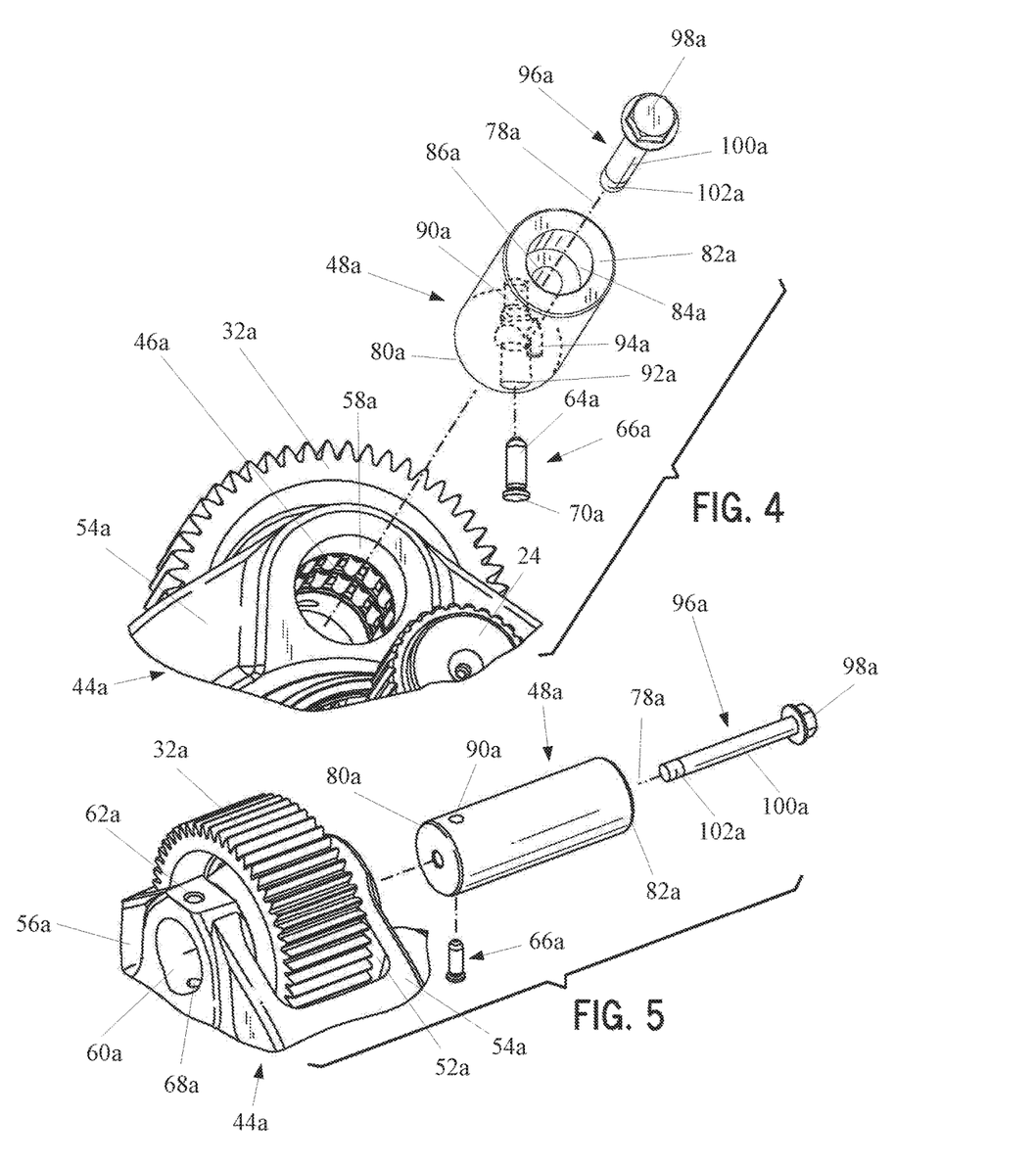
FIG. 4 is an enlarged partial exploded perspective view of a pinion and shaft assembly of the planetary gear set of FIG. 2.
FIG. 5 is another partial exploded perspective view thereof.

The pinion 32a may be rotatably coupled to a pinion carrier 44a through a pinion bearing 46a and a pinion shaft 48a. The pinion bearing 46a may be a roller bearing as shown in FIG. 4, or may be a ball bearing, bushing, or any other suitable type of bearing. The pinion bearing 46a has an inner race and an outer race with rollers or ball bearings situated between the inner race and outer race, which allows the inner race and outer race to rotate independently of each other. An inner radial surface of the pinion 32a may be rotatably mounted to the outer race of the pinion bearing 46a, such as through friction fit or thermal shrink fit. The outer radial surface of the pinion shaft 48a may interface with the inner race of the pinion bearing 46a, such that the pinion 32a may rotate relative to the pinion shaft 48a. The pinion shaft 48a is non-destructibly detachable from the pinion shaft 48a. The pinion 32a has a plurality of teeth on its outer radial surface for engaging both the sun gear 28a and the ring gear 30a.

If multiple pinions 32a are provided, for example three, then each pinion 32a is rotatably mounted, through its own respective pinion bearing 46a and pinion shaft 48a, to the pinion carrier 44a. Multiple pinions 32a may be spaced an equal angular distance from each other, for example, 120 degrees apart as shown in FIG. 2. Placing the pinions 32a an equal number of degrees apart balances the pinion carrier 44a resulting in smoother performance, less wear, and even wear. However, it will be appreciated that multiple pinions 32a may be placed at non-equal number of degrees apart, or may also be placed at different radial locations on the pinion carrier 44a.

The pinion carrier 44a may be coaxial with, and rotate about, the axis 34. The pinion carrier 44a may be rotatably mounted to the sun gear shaft 24 through a bearing (not shown). The bearing allows the pinion carrier 44a to be radially and axially restrained with regards to the sun gear shaft 24, but allows the pinion carrier 44a to rotate independently of the sun gear shaft 24. It will be appreciated that the pinion carrier 44a may similarly be supported against the housing 40 using a bearing (not shown) to allow the pinion carrier 44a to rotate independently of the housing 40.

The pinion carrier 44a may be generally cylindrical in shape, with an opening 50a passing through its axial center for accepting the sun gear shaft 24 and the sun gear 28a as shown in FIG. 2. Since the sun gear shaft 24 and sun gear 28a have different outer diameters, the inner diameter of pinion carrier 44a defining the opening 50a may vary in the axial direction to accommodate the sun gear shaft 24 and the sun gear 28a.

Referring now also to FIGS. 2 and 3, the pinion carrier 44a may have a window 52a for accepting the pinion 32a between a front flange 54a and a rear flange 56a through a portion of the periphery of the pinion carrier 44a and extending radially through the pinion carrier 44a to the opening 50a. The front flange 54a is located axially forward of the rear flange 56a. The window 52a should be large enough to accommodate the pinion 32a and allow the pinion 32a to freely rotate and engage the sun gear 28a and ring gear 30a. It will be appreciated that if multiple pinions 32a are provided, then multiple windows 52a may be similarly provided.

The pinion carrier 44a may have a through-hole 58a, located towards the periphery of the pinion carrier 44a and passing axially through the front flange 54a. The through-hole 58a has a diameter at least as large as the outer diameter of the pinion shaft 48a.

The pinion carrier 44a may have a rear flange opening 60a passing axially through the rear flange 56a. Alternatively, the rear flange opening 60a may instead be a recess on the forward facing axial surface and passing only partially through the rear flange 56a. The rear flange opening 60a and the through-hole 58a are radially aligned with one another. It will be appreciated that the areas of the pinion carrier 44a surrounding the opening 50a, window 52a, through-hole 58a, and rear flange opening 60a may be structurally reinforced, such as with ribs or additional material, as shown in FIGS. 2 and 5.

Referring now to FIGS. 3-7, a pinion carrier first bore 62a extends in an outward radial direction from the rear flange opening 60a through at least a portion of the rear flange 56a away from the axis 34. The diameter of the pinion carrier first bore 62a is at least large enough to accept a retaining pin shank 64a of a retaining pin 66a. The terminal end of the pinion carrier first bore 62a, if one is provided (e.g., as shown in FIG. 8), may for example, be rounded, flat, or pointed to conform to the shape of the tip of the retaining pin 66a. Alternatively, the pinion carrier first bore 62a may extend entirely through the rear flange 56a, such that an operator may visually inspect whether the retaining pin 66a is properly seated. A pinion carrier second bore 68a is coaxial with the pinion carrier first bore 62a, but extending in an opposite radial direction from the rear flange opening 60a, at least partially through the rear flange 56a, towards the axis 34. The pinion carrier second bore 68a may have a diameter less than the diameter of a retaining pin head 70a.

Figure 6:
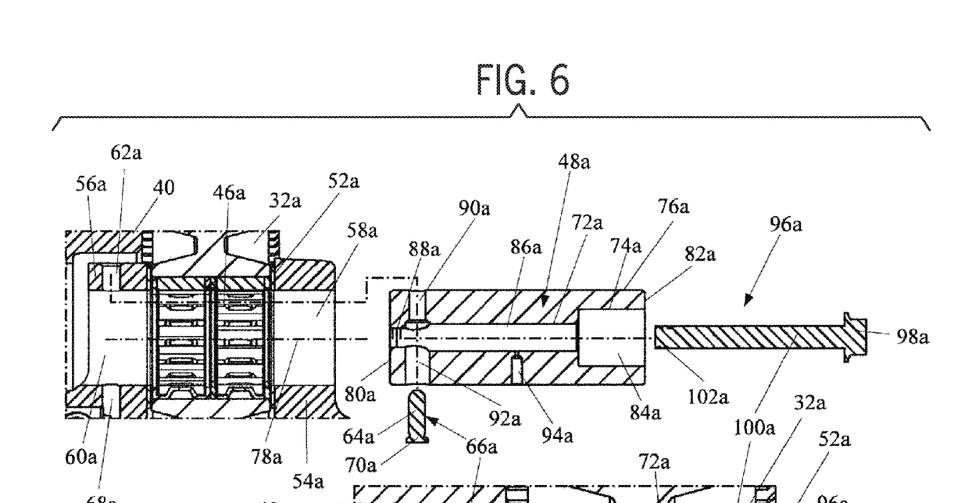
FIG. 6 is a side exploded cross-section view of thereof.

The pinion shaft 48a, as shown in greater detail in FIGS. 4-6, may be cylindrical in shape, and is rotatably and axially secured to the rear flange 56a using the retaining 66a. The pinion shaft 48a has an inner diameter 72a, a middle diameter 74a, and an outer diameter 76a. The inner diameter 72a is a diameter between a pinion rotation axis 78a passing through the radial center of the pinion shaft 48a and the outer diameter 76a. The middle diameter 74a is a diameter radially between the inner diameter 72a and the outer diameter 76a. The outer diameter 76a is the radial outer surface of the pinion shaft 48a and is slightly smaller than the diameter of the rear flange opening 60a, such that the pinion shaft 48a can at least partially fit inside the rear flange opening 60a. A portion of the outer diameter 76a of the pinion shaft 48a, towards a rear axial end 80a, abuts a portion of the rear flange opening 60a. The rear axial end 80a of the pinion shaft 48a is opposite a front axial end 82a. A recessed portion 84a extends from the front axial end 82a towards the rear axial end 80a in an axial direction, and outward from the pinion rotation axis 78a to the middle diameter 74a. A shaft bore 86a extends at least partially through the pinion shaft 48a from the recessed portion 84a towards the rear axial end 80a in an axial direction, and outward from the pinion rotation axis 78a to the inner diameter 72a. The shaft bore 86a may have shaft bore threads 88a at least partially along its axial length. The shaft bore threads 88a, for example, may be located towards the rearward most portion of the shaft bore 86a. The non-threaded portion of the shaft bore 86a may be smooth, and may have a slightly larger diameter than the threaded portion of the shaft bore 86a. It will be appreciated that in another embodiment the recessed portion 84a may extend axially from the rear axial end 80a towards the front axial end 82a.

Figure 7:
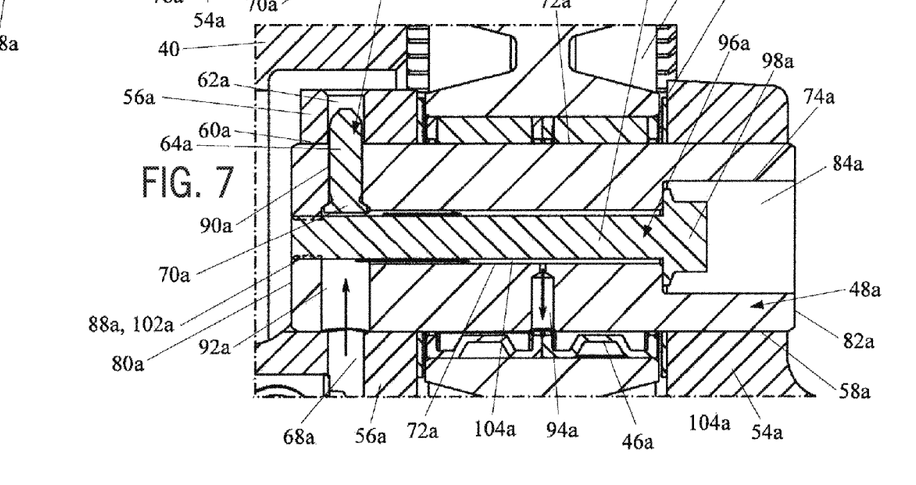
FIG. 7 is an enlarged cross-section view taken along arc 7-7 of FIG. 3.
Figure 8:
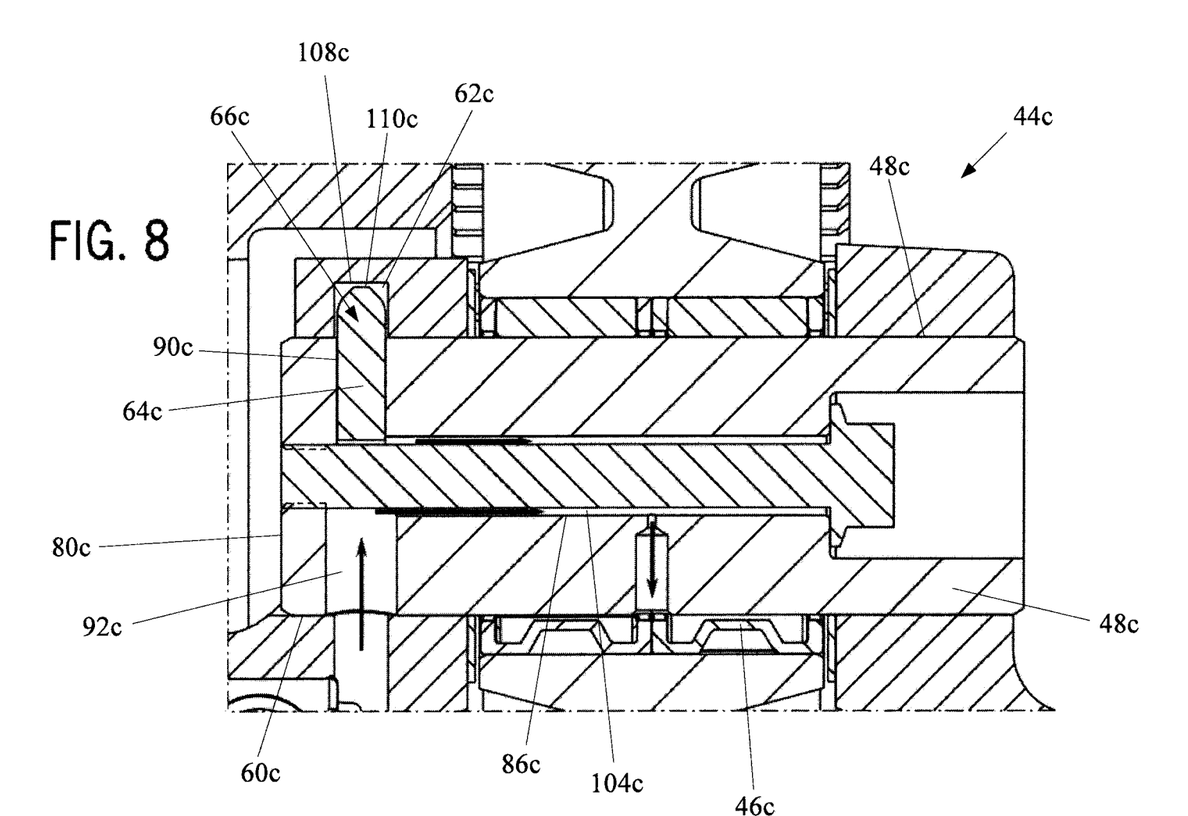
FIG. 8 is a view similar to FIG. 7 showing an alternate shaft retention arrangement.

Referring to FIG. 7, the pinion shaft 48a further has a plurality of radial bores: a pinion shaft radial first bore 92a, pinion shaft radial second bore 94a, and a pinion shaft radial third bore 90a. The pinion shaft radial third bore 90a and the pinion shaft radial first bore 92a are located towards the rear axial end 80a of the pinion shaft 48a, but forward of the shaft bore threads 88a. The pinion shaft radial third bore 90a extends through the pinion shaft 48a in a radial direction from the pinion rotation axis 78a through the outer diameter 76a. The pinion shaft radial third bore 90a may have a diameter at least equal to the diameter of the retaining pin head 70a at the inner diameter 72a and tapering inward to a diameter at least equal to the diameter of the retaining pin shank 64a at the outer diameter 76a. The shape and taper of the pinion shaft radial third bore 90a may help retain the retaining pin 66a, as described below. The pinion shaft radial first bore 92a is coaxial with the pinion shaft radial third bore 90a, but extends from the pinion rotation axis 78a to the outer diameter 76a in the opposite radial direction. The diameter of the pinion shaft radial third bore 90a is at least as wide as the retaining pin head 70a. The pinion shaft radial second bore 94a extends in a radial direction from the pinion rotation axis 78a through the outer diameter 76a. The pinion shaft radial second bore 94a may have a smaller diameter at the inner diameter 72a then at the outer diameter 76a to aid in metering a lubricating fluid.

The retaining pin 66a, as shown in FIG. 4 and mentioned above, has the retaining pin shank 64a and the retaining pin head 70a. The diameter of the retaining pin head 70a may taper in the axial direction from a diameter larger than the diameter of the retaining pin shank 64a to a diameter equal to, or slight less than the diameter of the retaining pin shank 64a as shown in FIG. 4. Alternatively, the retaining pin head 70a may not taper, and instead may have a diameter equal to, less than, or greater than the diameter of the retaining pin shank 64a. If the retaining pin head 70a tapers, then the taper may match the profile of the taper of the pinion shaft radial third bore 90a. The retaining pin shank 64a may have a tip or distal end that is flat, rounded, or any other suitable shape, and may match the profile of the pinion carrier first bore 62a if the pinion carrier first bore 62a has a terminal end.

A fastener, such as a cap screw 96a as shown in FIG. 5, may have a cap screw head 98a and a cap screw shank 100a. The cap screw 96a may also have cap screw threads 102a along a portion of the cap screw shank 100a. For example, the cap screw threads 102a may be located toward an axial end of the cap screw shank 100a opposite the cap screw head 98a. The diameter of the cap screw shank 100a is smaller than the diameter of the shaft bore 86a, such that the cap screw shank 100a can slide at least partially into the shaft bore 86a.

The diameter of the cap screw shank 100a may vary along is axial length. An annular gap passage 104a, as shown in FIG. 7, should be large enough to allow lubricating fluid to freely flow through the annular gap passage 104a in the direction of the arrows shown in FIG. 7. The cap screw 96a may slide into the shaft bore 86a and the cap screw threads 102a may mesh with the shaft bore threads 88a to releasably retain the cap screw 96a in the shaft bore 86a. The cap screw head 98a has a diameter wider than the shaft bore 86a, but smaller than the diameter of the recessed portion 84a, and may provide a fluid sealing function. The sealing function may be provided through a washer or O-ring, or through a press fit between a portion of the cap screw shank 100a and a portion of the shaft bore 86a.

In an assembled state, as shown in FIGS. 3 and 7, the pinion shaft 48a fits within the through-hole 58a towards the front axial end 82a, and may abut or be radially spaced from the front flange 54a. The pinion shaft 48a abuts the rear flange opening on the outer diameter 76a towards the rear axial end 80a of the pinion shaft 48a. The pinion carrier first bore 62a and the pinion shaft radial third bore 90a are coaxial and may have the same diameter at the interface between. The pinion carrier second bore 68a and the pinion shaft radial first bore 92a are also coaxial at least at the interface between the two and may have the same or different diameters at the interface. In the opposite radial direction, the pinion carrier second bore 68a interfaces with, and is coaxial with, the sun gear shaft radial bore 38. The retaining pin 66a fits within the pinion carrier first bore 62a and the pinion shaft radial third bore 90a such that at least a portion of the retaining pin shank 64a is within the pinion carrier first bore 62a and at least a portion of the retaining pin head 70a is within the pinion shaft radial third bore 90a.

The cap screw 96a fits at least partially within the shaft bore 86a of the pinion shaft 48a. The cap screw 96a may be secured within the shaft bore 86a by messing the cap screw threads 102a with the shaft bore threads 88a. In a secured state, the annular gap passage 104a is formed between the cap screw shank 100a and the inner diameter 72a of the pinion shaft 48a. The annular gap passage 104a extends in an axial direction from at least the pinion shaft radial first bore 92a to the pinion shaft radial second bore 94a. The width of the annular gap passage 104a in a radial direction should be wide enough to allow a lubricating fluid to freely pass through the annular gap passage 104a. It will be appreciated that the width of the annular gap passage 104a will depend on the fluid characteristics of the lubricating fluid, such as temperature and viscosity, as well as the desired flow rate of the lubricating fluid through the annular gap passage 104a. The cap screw head 98a abuts the pinion shaft 48a, fits entirely within the recessed portion, and forms a fluid seal between the recessed portion 84a and the annular gap passage 104a. The fluid seal, for example may be through an O-ring, washer, abutment of the cap screw head 98a and the pinion shaft 48a, or any other suitable sealing means.

In an assembled state, the lubricating fluid is supplied under pressure from a lubricating fluid reservoir (not shown) to the sun gear shaft axial bore 36. Lubricating fluid passes through the sun gear shaft axial bore 36 to the sun gear shaft radial bore 38 to the pinion carrier second bore 68a to the pinion shaft radial first bore 92a. Lubricating fluid enters the pinion shaft 48a through the pinion shaft radial first bore 92a, travels through the annular gap passage 104a as shown by the arrows in FIG. 7 and exits the pinion shaft 48a through the pinion shaft radial second bore 94a. The pinion shaft radial second bore 94a fluidly connects the pinion bearing 46a with the pinion shaft 48a and allows lubricating fluid to enter the pinion bearing 46a and the pinion 32a. It will be appreciated that addition pinion shaft radial bores may be used to fluidly connect the pinion shaft 48a and the pinion bearings 46a to ensure adequate lubrication of the pinion bearing 46a and the pinion 32a. At least partial lubrication of the pinion bearing 46a and the pinion 32a may be achieved through gravity, rotation of the pinion 32a, fluid pressure, centrifugal force, or any other suitable means. Lubricating fluid is prevented from exiting the pinion shaft 48a, except at the pinion shaft radial second bore 94a, by the meshing of the shaft bore threads 88a and the cap screw threads 102a, by the abutment of the cap screw head 98a and the recessed portion 84a, and the retaining pin 66a engaging the pinion shaft radial third bore 90a.

The pinion shaft 48a may be assembled by an operator by inserting the retaining pin 66a into a non-retaining position. The retaining pin 66a is inserted, retaining pin shank 64a first, partially through the pinion shaft radial first bore 92a, through the shaft bore 86a, and partially into the pinion shaft radial third bore 90a, such that the retaining pin 66a is entirely within the outer diameter 76a of the pinion shaft 48a. The pinion shaft 48a is slid through the through-hole 58a in the front flange 54a, with the rear axial end 80a of the pinion shaft 48a passing through first, and through the center of the pinion bearing 46a attached to the pinion 32a. The pinion shaft 48a is then slid into the rear flange opening 60a and rotated until the pinion carrier first bore 62a aligns with pinion shaft radial third bore 90a and the pinion carrier second bore 68a aligns with the pinion shaft radial first bore 92a. The retaining pin 66a can then fully drop into the pinion shaft radial third bore 90a and the pinion carrier first bore 62a, such as through gravity or manipulation by the operator, resulting in a retaining position. To use gravity to insert the retaining pin 66a, the operator can rotate the pinion carrier 44a about the axis 34 until the pinion carrier first bore 62a is vertically lower than the axis 34. The pinion 32a and the pinion bearing 46a can be adjusted axially on the pinion shaft 48a until the pinion bearing 46a and pinion 32a are aligned with the pinion shaft radial second bore 94a, and the gear teeth of the pinion 32a mesh with the gear teeth of the sun gear 28a and the gear teeth of the ring gear 30a. The cap screw 96a is inserted into the shaft bore 86a, and secured by meshing the cap screw threads 102a with the shaft bore threads 88a. When in a secured position, the cap screw 96a prevents the retaining pin 66a from exiting the pinion shaft third radial bore 90a, even when the pinion carrier 44a is rotated.

To disassemble the pinion shaft 48a from the pinion carrier 44a, the operator removes the cap screw 96a from the shaft bore 86a by unmeshing the cap screw threads 102a from shaft bore threads 88a and sliding the cap screw 96a out of the shaft bore 86a. With the cap screw 96a no longer within the shaft bore 86a, the operator may use gravity or may physically manipulate the retaining pin 66a out of the pinion carrier first bore 62a and partially out of the pinion shaft radial third bore 90a. The operator can slide the retaining pin 66a at least partially into the pinion shaft radial first bore 92a, such that the retaining pin 66a is entirely within the outer diameter 76a of the pinion shaft 48a. If the operator uses gravity to remove the retaining pin 66a, such as by rotating the pinion carrier 44a such that the pinion carrier radial third bore 90a is vertically higher than the axis 34, the smaller diameter of the pinion carrier second bore 68a prevents the retaining pin 66a from entering the pinion carrier second bore 68a while allowing the retaining pin 66a to fully exit the pinion carrier first bore 62a. The pinion shaft 48a may then be slid axially away from the pinion carrier 44a. The pinion shaft 48a is slid out of the rear flange opening 60a and out of the pinion bearing 46a. The pinion shaft 48a is then slid out of the front flange 54a. The retaining pin 66a may be removed entirely from the pinion shaft 48a through the pinion shaft radial first bore 92a.

While in an operating mode, the pinion carrier 44a may rotate about the axis 34. The centrifugal force due to the rotation of the pinion carrier 44a causes the retaining pin 66a to continuously assume an outwardly-projecting retaining position from the axis 34, retaining the retaining pin 66a in the pinion carrier first bore 62a and pinion shaft radial third bore 90a due to the location and shape of the bores. The resulting wedging force between the retaining pin 66a and the pinion carrier 44a retains the pinion shaft 48a, preventing axial and rotational movement of the pinion shaft 48a relative to the pinion carrier 44a, while the first planetary gear set 22a is rotating at a sufficient speed. When the pinion carrier 44a is not rotating, or the centrifugal force is no longer sufficient due to a slower rotational speed, then the cap screw 96a may physically block the retaining pin 66a from exiting the pinion shaft radial third bore 90a and the pinion carrier first bore 62a. This blocking of the retaining pin 66a at least partially, if not completely, constrains the axial and rotational movement of the pinion shaft 48a. Alternatively, if the retaining pin head 70a has a diameter equal to or less than the retaining pin shank 64a, and does not press against the pinion shaft 48a, then instead of the retaining pin head 70a wedging against the pinion shaft 48a, the tip of the retaining pin shank 64a abuts against a terminal end of the pinion carrier first bore 62a.

In addition to the centrifugal force, the pressure of the lubricating fluid in the annular gap passage 104a, during the operating mode, presses against the retaining pin head 70a, pushing it away from the annular gap passage 104a, and retaining the retaining pin 66a in the pinion shaft radial third bore 90a and the pinion carrier first bore 62a. It will be appreciated that a larger diameter retaining pin head 70a will result in a greater force due to pressure being exerted on the retaining pin 66a.

In an embodiment having a stacked planetary gear set configuration, the pinion carrier 44b is also secured to the sun gear shaft 24 through a bearing (not shown). A bearing 106, shown as a ball bearing in FIG. 3, interfaces between the pinion carriers 44a and 44b to provide axial support, but allow the pinion carriers 44a and 44b to rotate independently of one another. It will be appreciated that a stacked planetary gear set may further have any number of additional gear sets similar to the first planetary gear set 22a described above.

As mentioned above, the gear teeth of the sun gear 28a meshes with the gear teeth of the pinion 32a. The gear teeth of the ring gear 30a meshes with the gear teeth of the pinions 32a. The gear teeth of the pinions 32a mesh with the gear teeth of the ring gear 30a, and the gear teeth of the sun gear 28a. It will be appreciated the sun gear 28a, the ring gear 30a, and the pinion 32a may, for example, be spur gears or helical gears. The gear ratio of the gear set 20 may be adjusted by locking certain gears and/or by selecting the first planetary gear set 22a or the second planetary gear set 22b. Locking the gears may be accomplished through actuators, forks, clutches, brakes, pistons, and/or any other suitable means. For example, the first planetary gear set 22a may be selected, and then the ratio may be varied by locking the pinion 32a and allowing the sun gear 28a and the ring gear 30a to freely rotate. The sun gear 28a may be locked, or alternatively the ring gear 30a may be locked. If two gears are locked, such as the ring gear 30a and the pinion 32a, then a ratio of 1:1 may be achieved between an input and output shaft of the gear set 20. Alternatively, the second planetary gear set 22b may be chosen, and the sun gear (not shown), ring gear (not shown), and the pinion 32b, may be selectively locked to vary the gear ratio. It will be appreciated that different diameters between the gears in the first planetary gear set 22a and the second planetary gear set 22b will result in more gear ratios.

In an alternative embodiment, as shown in FIG. 8, a pinion carrier 44c may be similar to the embodiments listed above and have similar components. The pinion carrier 44c has a pinion carrier first bore 62c extending in an outward radial direction from the rear flange opening 60c. The pinion carrier first bore 62c extends partially through the pinion carrier 44c and terminates at a pinion carrier first bore end 108c. The pinion carrier first bore end 108c may be flat as shown in FIG. 8, or alternatively may be curved or tapered to match the profile of a tip 110c of a retaining pin 66c. The pinion carrier first bore end 108c may limit the outward radial movement of the retaining pin 66c during operation of the pinion carrier 44c. The retaining pin 66c has a retaining pin shank 64c, and may lack a retaining pin head. The pinion shaft 48c has a pinion shaft radial bore 90c with a diameter at least at least equal to the diameter of the retaining pin shank 64c. The pinion shaft radial further bore 92c may have a diameter less than the diameter of the retaining pin shaft 64c.

An operator may assemble the pinion shaft 48c by inserting the retaining pin 66c into the pinion shaft radial bore 90c, such that the tip 110c of the retaining pin 66c is inserted into the pinion shaft radial bore 90c last. As in prior embodiments, the retaining pin 66c is entirely retained within the outer diameter 76c of the pinion shaft 48c. The pinion shaft 48c is slid through the through the through-hole 58c with the rear axial end 80c passing through first, passing through the center of the pinion bearing 46c, and passing into the rear flange opening 60c. The pinion shaft 48c is then rotated, as needed, until the pinion carrier first bore 62c aligns with pinion shaft radial bore 90c. The pinion carrier 44c can be manipulated causing the retaining pin 66c to be disposed within pinion carrier first bore 62c and abut the pinion carrier first bore end 108c, such as through gravity. The cap screw 96c may then be inserted into the shaft bore 86c and secured to the pinion shaft 48c to prevent the retaining pin 66c from exiting the pinion carrier first bore 62c.

During operation of the pinion carrier 44c, the pinion carrier 44c may rotate about the axis 34. The centrifugal force due to the rotation of the pinion carrier 44c causes the retaining pin 66c to continuously assume an outwardly-projecting retaining position from the axis 34, retaining the retaining pin 66c against the pinion carrier first bore end 108c, in the pinion carrier first bore 62c, and in the pinion shaft radial bore 90c due to the location and shape of the bores. The pinion carrier first bore end 108c prevents further outward movement of the retaining pin 66c by physically blocking the retaining pin 66c. Alternatively and/or additionally, the pressure of the lubricating fluid in the annular gap passage 104c may assist in retaining the retaining pin 66c in the pinion carrier first bore 62c by the lubricating fluid pressing against the retaining pin 66c on the end of the retaining pin 66c exposed to the annular gap passage 104c.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A gear shaft retention and lubrication system, comprising:
   a gear mounted to a gear shaft extending along an axis, the gear shaft having a shaft first radial bore extending from an outer surface of the gear shaft at least partially through the gear shaft in a radial direction, the gear shaft having a shaft second radial bore extending from an outer surface of the gear shaft at least partially through the gear shaft in a radial direction, the shaft second radial bore being axially aligned with the gear, the gear shaft having a shaft axial bore having a shaft axial bore diameter, the shaft axial bore extending in an axial direction at least partially through the gear shaft and through at least one of the shaft first radial bore and the shaft second radial bore;
   a mounting surface having an opening at least partially in the axial direction receiving the gear shaft and having a mounting surface first radial bore coaxial with the shaft first radial bore and extending from the opening through at least a portion of the mounting surface;
   a fastener having a fastener head and a fastener shank, the fastener disposed at least partially within the shaft axial bore; and
   wherein an annular gap passage is formed between the shaft axial bore and the fastener shank in a radial direction and between the shaft first radial bore and the shaft second radial bore in an axial direction.

2. The gear shaft retention and lubrication system of claim 1, wherein the gear is a pinion, the gear shaft is a pinion shaft, and the mounting surface is a pinion carrier.

3. The gear shaft retention and lubrication system of claim 1, further comprising:
   a retaining pin movable from a non-retaining position to a retaining position; and
   a shaft third radial bore extending from the outer surface of the gear shaft and in communication with the shaft first radial bore, the shaft third radial bore being coaxial with the shaft first radial bore; and
   a mounting surface second radial bore coaxial with the shaft third radial bore and extending from the opening through at least a portion of the mounting surface;
   wherein the gear shaft is mounted in the opening such that in the non-retaining position the retaining pin is entirely within the gear shaft and in the retaining position the retaining pin passes through the shaft third radial bore and the mounting surface second radial bore and the fastener is disposed at least partially within the shaft axial bore and at least partially blocks the retaining pin from moving from the retaining position to the non-retaining position.

4. The gear shaft retention and lubrication system of claim 3, wherein the retaining pin has a retaining pin shank and a retaining pin head, and wherein the mounting surface second radial bore has a diameter at least as large as the diameter of the retaining pin shank and at least a portion of the shaft third radial bore has a shaft third radial bore diameter at least as large as the retaining pin head.

5. The gear shaft retention and lubrication system of claim 4, wherein the mounting surface rotates about an axis of rotation, the gear shaft is offset a radial distance from the axis of rotation, wherein the rotation of the mounting surface creates a centrifugal force in a radial direction away from the axis, and the retaining pin is at least partially retained in retaining position due to the centrifugal force.

6. The gear shaft retention and lubrication system of claim 1, wherein the gear shaft has a gear shaft recess, the gear shaft recess having a gear shaft recess diameter greater than the shaft axial bore diameter and the gear shaft recess extending in the axial direction only partially through the gear shaft.

7. The gear shaft retention and lubrication system of claim 6, wherein the fastener has a fastener head diameter smaller than the gear shaft recess diameter and larger than the shaft axial bore diameter, and wherein the fastener head is entirely located within the gear shaft recess such that the fastener head fluidly seals the shaft axial bore from the gear shaft recess.

8. The gear shaft retention and lubrication system of claim 7, wherein the fastener head is entirely located within the gear shaft recess such that the fastener head fluidly seals the shaft axial bore from the gear shaft recess.

9. The gear shaft retention and lubrication system of claim 6, wherein the mounting surface second radial bore coaxial has a diameter smaller than the diameter of the retaining pin head.

10. The gear shaft retention and lubrication system of claim 9, wherein the mounting surface first radial bore, the shaft first radial bore, the annular gap passage between the shaft axial bore and the fastener shank, the shaft second radial bore, and the gear are fluidly connected to provide a lubricating fluid passage.

11. A gear shaft retention and lubrication system, comprising:
a gear mounted to a gear shaft extending along an axis, the gear shaft having a shaft first radial bore extending from an outer surface of the gear shaft at least partially through the gear shaft in a radial direction, the gear shaft having a shaft second radial bore extending between the outer surface and the shaft axial bore, the shaft second radial bore being axially aligned with the gear, the gear shaft having a shaft axial bore having a shaft axial bore diameter, the shaft axial bore extending in an axial direction at least partially through the gear shaft and through at least one of the shaft first radial bore and the shaft second radial bore, the gear shaft having a gear shaft recess, the gear shaft recess having a gear shaft recess diameter greater than the shaft axial bore and the gear shaft recess extending in the axial direction only partially through the gear shaft;
a mounting surface having an opening at least partially in the axial direction receiving the gear shaft and having a mounting surface first radial bore coaxial with the shaft first radial bore and extending from the opening through at least a portion of the mounting surface; and
a fastener having a fastener head and a fastener shank, the fastener head having a diameter smaller than the gear shaft recess diameter and larger than the shaft bore diameter, the fastener disposed at least partially into the shaft axial bore;
wherein an annular gap passage is formed between the shaft axial bore and the fastener shank in a radial direction and between the shaft first radial bore and the shaft second radial bore in an axial direction.

12. The gear shaft retention and lubrication system of claim 11, wherein the gear shaft includes a shaft third radial bore, coaxial with the shaft first radial bore, the shaft third radial bore extending from the outer surface of the gear shaft an in communication with the shaft first radial bore.

13. The gear shaft retention and lubrication system of claim 11, wherein the shaft second radial bore is coaxial with the shaft first radial bore, the shaft second radial bore extending from the outer surface of the gear shaft and in communication with the shaft first radial bore; and
wherein the mounting surface has a mounting surface second radial bore coaxial with the shaft third radial bore and extending from the opening through a portion of the mounting surface.

14. The gear shaft retention and lubrication system of claim 13, further comprising:
a retaining pin having a retaining pin tip, the retaining pin being moveable from a non-retaining position to a retaining position;
wherein the gear shaft is mounted in the opening such that in the non-retaining position the retaining pin is entirely within the gear shaft and in the retaining position the retaining pin passes through the shaft third radial bore and the mounting surface second radial bore;
wherein the fastener at least partially blocks the retaining pin from moving from the retaining position to a non-retaining position.

15. The gear shaft retention and lubrication system of claim 11, wherein the gear shaft has a gear shaft recess, the gear shaft recess having a gear shaft recess diameter greater than the shaft axial bore and the gear shaft recess extending in the axial direction only partially through the gear shaft; and
wherein the fastener head has a fastener head diameter smaller than the gear shaft recess diameter and larger than the shaft bore diameter, and wherein the fastener head is entirely located within the gear shaft recess such that the fastener head fluidly seals the shaft bore from the gear shaft recess.

16. The gear shaft retention and lubrication system of claim 11, wherein the mounting surface first radial bore, the shaft first radial bore, the annular gap passage, the shaft second radial bore, and the gear are fluidly connected to provide a lubricating fluid passage.

17. A method of retaining and lubricating a gear and a gear shaft comprising the steps of:
providing a mounting surface having a mounting surface first radial bore;
providing a gear shaft mounted to the mounting surface, the gear shaft having a shaft first radial bore coaxial with the mounting surface first radial bore, a shaft second radial bore, and an axial shaft bore having a shaft axial bore diameter;
providing a gear and gear bearing mounted to the gear shaft;
providing a fastener having a fastener shank, the fastener shank having a fastener shank diameter less than the shaft axial bore diameter, the fastener shank at least partially disposed within the shaft axial bore defining an annular gap passage between the shaft axial bore and the fastener shank;
fluidly connecting the mounting surface first radial bore, the shaft first radial bore, the annular gap passage, the shaft second radial bore, the gear bearing, and the gear; and
supplying lubricating fluid to the mounting surface.

18. The method of claim 17, further comprising:
providing a gear shaft third radial bore through the gear shaft and coaxial with the gear shaft first radial bore;
providing a mounting surface second radial bore coaxial at least partially through the mounting surface and coaxial with the gear shaft third radial bore; and
providing a retaining pin having a retaining pin head, the retaining pin at least partially disposed within the gear shaft third radial bore and the mounting surface second radial bore.

* * * * *